Nov. 17, 1970     A. M. BARTZ     3,540,301

TIMING BELT

Filed July 1, 1968

INVENTOR.
Arnold M. Bartz
BY
Edward E. Schilling
ATTORNEY

United States Patent Office 3,540,301
Patented Nov. 17, 1970

3,540,301
TIMING BELT
Arnold M. Bartz, Midland, Mich., assignor to The Dow Chemical Company, Midland, Mich., a corporation of Delaware
Filed July 1, 1968, Ser. No. 741,526
Int. Cl. F16g 1/16, 1/28
U.S. Cl. 74—231     7 Claims

ABSTRACT OF THE DISCLOSURE

A preformed precision timing belt of flexible polymeric material for driving a spectrophotometer chopper and the like is provided with integrally formed, evenly spaced, generally oblate, sprocket-engaging enlargements and is reinforced with a core of a plurality of coextensive strands of yarn, e.g., rayon or cotton yarn.

BACKGROUND OF THE INVENTION

Field of the invention

The invention relates to a precision timing belt for driving rotating parts in phase in small equipment, e.g., a spectrophotometer chopper and the like, generally at rather low speeds, such as 5 to 100 revolutions per minute.

Description of the prior art

V-belts, or molded belts that are round in section are generally not suitable for use as precision timing belts where avoidance of slippage is critical to phase control. Precision timing belts that are not subject to slippage have been devised consisting of (1) an endless series of links each consisting of a metal ball provided with a rod-shaped projection, and each link flexibly interconnected to the next link in the sequence of rod-shaped projection to ball, or (2) an endles belt formed of polymeric material provided with a series of evenly spaced, bilaterally projecting, sprocket tooth-engaging pins.

The belts of uniform dimension provide no assurance of maintaining critical phase relationships. The metal chains are subject to undesired wear in the flexible linkage giving rise to undesired chain lengthening and breakage. The chains also tend to be noisy. The belts provided with bilaterally extending pin portions are used in conjunction with sprockets in the form of spur gears with the gear teeth notched at about mid-width to provide an apparent peripheral groove substantially the same depth as the "valleys" or notches between the gear teeth. In using such a belt, it is found that the pin portions wear inordinately quickly, resulting in inaccuracies in phasing the chopper, and ultimately, in loss of pin portions from the belt.

OBJECT OF THE INVENTION

It is a principal object of the invention to provide a precision timing belt for light equipment which is moderate in cost, precise and quiet in operation, and exhibits a long service life.

Figure 1:
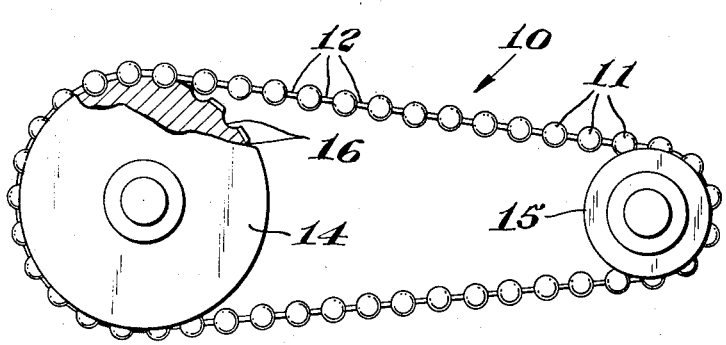
Figure 2:
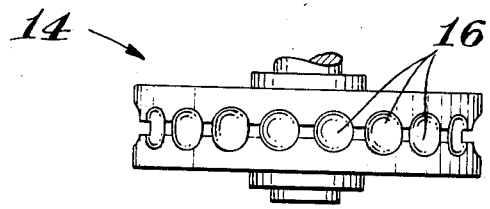
Figure 3:
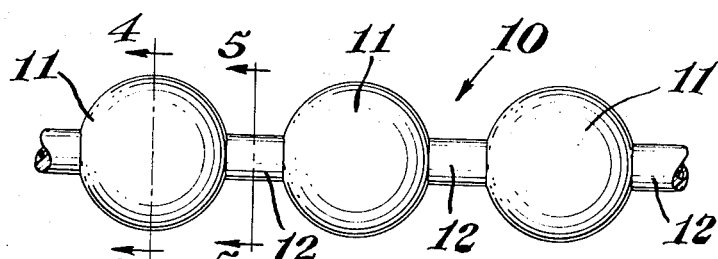
Figure 4:
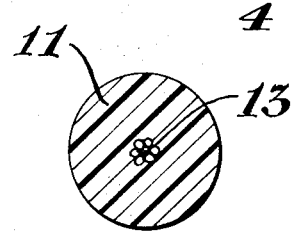
Figure 6:
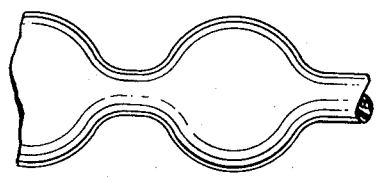
Figure 5:
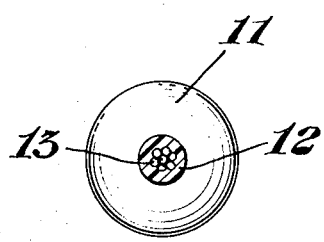

This and other objects and advantages of the present invention will be apparent to those skilled in the art upon becoming familiar with the following description and the appended drawings in which like reference numerals refer to like parts, and in which FIG. 1 is a view in side elevation of two sprocket wheels interconnected by the timing belt of the invention, the larger sprocket wheel being shown partly broken away in section along a plane extending through the peripheral groove, FIG. 2 is a plan view of the larger sprocket wheel of FIG. 1;
FIG. 3 is an enlarged fragmentary view in side elevation of the timing belt of FIG. 1;
FIG. 4 is a view in section through a spherical sprocket engaging enlargement of the timing belt of the invention, taken along the line 4—4 of FIG. 3;
FIG. 5 is a view of the timing belt in section taken along the line 5—5 of FIG. 3; and
FIG. 6 is an enlarged fragmentary view in side elevation of another embodiment of the present timing belt having differently shaped sprocket-engaging enlargements.

SUMMARY OF THE INVENTION

The present timing belt is a unitary preformed endless belt formed of flexible polymeric material having integrally formed as a part thereof a series of equally spaced apart, uniformly sized, generally oblate, sprocket-engaging enlargements concentric with the remainder of the belt, the belt being reinforced with a core of a flexible filamentary reinforcing element. Preferably the sprocket engaging enlargements are spheroidal. A superior precision drive train is provided by such timing belt in combination with a plurality of a sprocket wheel each having a peripheral face with equally spaced substantially hemispherical depressions formed therein and interconnected by a peripheral groove formed in said face, the depression being sized to receive the generally oblate spherical enlargements and the groove being dimensioned to receive the belt portions between the generally oblate enlargements.

DETAILED DESCRIPTION OF THE INVENTION

Referring more particularly to FIG. 1, the timing belt indicated generally by the number 10, is seen to be continuous, i.e., unitary, and to be provided with a series of integrally formed, equally spaced apart, uniformly sized, spherical shaped, sprocket engaging enlargements 11 interconnected by elongated smaller connecting portions 12.

The spherical enlargements 11 are ordinarily axially aligned with and interconnected by the smaller connecting portions 12, as seen in FIG. 5, though exact alignment concentricity is not essential if the spherical enlargements are connected in a uniform manner and the belt is kept from twisting.

To kep the belt from becoming distorted and stretched to a longer length, it is best reinforced by a flexible filamentary reinforcing core element 13 which is coextensive with the belt and is normally embedded centrally, i.e. axially, of the belt. The reinforcing core element may be a monofilament yarn or a multifilament yarn. It may be embedded singly, or, in bundles as shown in FIGS. 4 and 5. Such yarn may be formed of rayon or cotton filaments or glass fibers and have a diameter of about $\frac{1}{64}$ to $\frac{1}{32}$ or more. Preferably the strands of yarn are each isolated by a thin surrounding sheath of polymeric material, and the sheathed strands are embedded in the belt in bundles with substantially no polymeric material of the belt intervening between the strands, permitting better flexing of the core.

The flexible filamentary reinforcing element may be made up of about half a dozen or more monofilaments, such as fine steel wire or glass strands, or synthetic polymeric material, or of strands of yarn formed of natural or synthetic fibers that withstand a lot of flexing, e.g., yarn made of rayon or cotton, or fine glass fibers. Preferably the filaments or yarns, or sheaths if used, bond to the belt material to give the best reinforcing effect.

The belt itself is suitably made, i.e., preformed, by molding a flexible, durable, creep-resistant material such as nylon, or other suitable polymeric material. Lightly cross-linked synthetic rubber polymers may also be used in making the belt, e.g., butadiene-acrylonitrile copolymer. Other suitable materials include lightly cross-linked polymerized polyolefins and polytetrafluoroethylene, if the rotational speed anticipated is fairly low. Polyvinyl chloride may be used if some HCl vapor can be tolerated. During molding of the belt, the core threads are suitably disposed according to well-known methods of manufacture, to accomplish proper embedding.

A suitable type of sprocket wheel 15 with which the belt forms a superior flexible drive train, is illustrated in FIGS. 1 and 2. It is to be understood that sprocket wheel 15 is similar in construction to sprocket wheel 14. Since the spherical enlargements 11 of the belt move smoothly in and out of substantially hemispherical depressions 16 of the sprocket wheels 14, 15, and sharp corners are generally not moving abrasively against the spherical enlargements, the belt exhibits a long service life with little wear of the spherical enlargements. Moreover, the spherical enlargements, being substantial in size compared to the rest of the belt, there is little chance of outright failure of the belt to engage the sprocket wheel, even after substantial wearing down of such enlargements.

In an additional embodiment of the belt of the invention, the enlarged sprocket engaging portions are not truly spherical, but are oblate or spheroidal, and the sprocket wheels usable therewith have depressions in the peripheral face which are complementary to the enlargements in the belt. The departure from sphericity that is preferred lies in smoothing out the juncture between the enlargement and the smaller portions of the belt, as illustrated in FIG. 6, so that there is a smooth curve there between, rather than the abrupt juncture of a small cylinder extending normal to the surface of a sphere. Sprocket-engaging enlargements of such spheroidal or oblate shape engage complementary depressions in a sprocket wheel with a minimum of abrasive friction, especially since there are substantially no sharp edges on the defining walls of the depressions in the sprocket wheel to scrape or wear away the said enlargements.

Among the advantages of the present long wearing timing belt is its quietness in operation.

I claim:
1. An endless timing belt for driving spectrophotometer choppers and the like, which comprises:
a unitary preformed endless belt formed of flexible polymeric material, said belt having formed integrally as a part thereof a series of evenly spaced apart, generally oblate, uniformly-sized, sprocket engaging enlargements aligned with and interconnected by elongated smaller connecting portions, and said belt being reinforced by a flexible filamentary reinforcing core element.

2. The timing belt as in claim 1 in which the smaller connecting portions between the sprocket engaging enlargements are substantially circular in section.

3. The timing belt as in claim 1 in which the reinforcing core element consists of strands of yarn and each strand of yarn is isolated by a polymeric sheath and the strands are disposed contiguously in a bundle.

4. The timing belt as in claim 1 wherein the flexible filamentary reinforcing core element is a material selected from the group consisting of cotton, rayon, and glass fiber yarns, and fine steel wire monofilaments.

5. The timing belt as in claim 1 formed substantially of nylon, a lightly cross-linked polyolefin or a lightly cross-linked synthetic rubber material.

6. The timing belt of claim 1 in operative combination with a plurality of sprocket wheels, each said sprocket wheel having a peripheral face with equally spaced substantially hemispherical depressions formed therein, said depressions being interconnected by a peripheral groove in the face of said sprocket wheel, said depressions being only slightly larger in diameter than the said spherical enlargements of the timing belt so as to receive the enlargements in a precise manner and the groove being wide enough and deep enough to receive the belt portions between the enlargements when the depressions receive the enlargements.

7. The timing belt as in claim 1 in which the sprocket-engaging enlargements are generally spheroidal.

References Cited

UNITED STATES PATENTS

| | | |
|---|---|---|
| 332,672 | 12/1885 | Mellette et al. |
| 2,564,326 | 8/1951 | Dray. |
| 2,739,090 | 3/1956 | Waugh. |
| 3,026,737 | 3/1962 | Berg _____ 74—229 |

FOREIGN PATENTS

| | | |
|---|---|---|
| 1,108,374 | 8/1955 | France. |

JAMES A. WONG, Primary Examiner